(12) United States Patent
Horn et al.

(10) Patent No.: US 9,777,159 B2
(45) Date of Patent: Oct. 3, 2017

(54) PYROLYSIS PROCESS AND PRODUCTS

(71) Applicant: REKLAIM LLC, Seattle, WA (US)

(72) Inventors: Joel Horn, Seattle, WA (US); Daniel F. Kapral, Vancouver, WA (US); William J. Langley, Jr., Ellisville, MS (US); Thomas A. Reynolds, Bend, OR (US)

(73) Assignee: Reklaim, Inc., Seattle, WA (US)

( * ) Notice: Subject to any disclaimer, the term of this patent is extended or adjusted under 35 U.S.C. 154(b) by 334 days.

(21) Appl. No.: 14/542,412

(22) Filed: Nov. 14, 2014

(65) Prior Publication Data

US 2015/0139889 A1 May 21, 2015

Related U.S. Application Data

(63) Continuation of application No. 12/904,016, filed on Oct. 13, 2010, now Pat. No. 8,888,961.

(Continued)

(51) Int. Cl.
| | |
|---|---|
| *C10B 51/00* | (2006.01) |
| *C09C 1/48* | (2006.01) |
| *C10B 7/02* | (2006.01) |
| *C10B 7/14* | (2006.01) |
| *C10B 47/34* | (2006.01) |

(Continued)

(52) U.S. Cl.
CPC .............. *C09C 1/482* (2013.01); *C10B 7/02* (2013.01); *C10B 7/14* (2013.01); *C10B 47/34* (2013.01); *C10B 49/04* (2013.01); *C10B 53/07* (2013.01); *C01P 2004/03* (2013.01); *C01P 2004/52* (2013.01); *C10B 53/00* (2013.01); *C10G 3/40* (2013.01); *Y02P 20/143* (2015.11); *Y02P 30/20* (2015.11)

(58) Field of Classification Search
CPC .................. C09C 1/482; C10G 3/40
USPC .... 201/25, 29, 30, 33–35; 202/96, 104, 117; 585/241; 110/246
See application file for complete search history.

(56) References Cited

U.S. PATENT DOCUMENTS

| | | |
|---|---|---|
| 829,105 A | 8/1906 | Doherty |
| 864,186 A | 8/1907 | Ostertag |

(Continued)

FOREIGN PATENT DOCUMENTS

| | | |
|---|---|---|
| CN | 1468288 A | 1/2004 |
| CN | 102770509 A | 11/2012 |

(Continued)

OTHER PUBLICATIONS

CN 201080056905.0 filed Jun. 14, 2012 First Office Action dated Jun. 8, 2013.

(Continued)

*Primary Examiner* — Nina Bhat
(74) *Attorney, Agent, or Firm* — Rutan & Tucker, LLP

(57) ABSTRACT

A pyrolysis device and process to convert a carbonaceous feedstock to a carbon solid and pyrolysis gas, and processes for refining the resulting carbon solid and pyrolysis gases. The pyrolysis process may include introducing a carbonaceous feedstock into a pyrolysis processor having a vertical rotary tray processor, heating the feedstock to a temperature above about 790° F., removing a carbon material from a bottom of the pyrolysis processor, and removing a pyrolysis gas from a top of the pyrolysis processor.

31 Claims, 7 Drawing Sheets

Related U.S. Application Data

(60) Provisional application No. 61/251,721, filed on Oct. 14, 2009.

(51) Int. Cl.
  *C10B 49/04* (2006.01)
  *C10B 53/07* (2006.01)
  *C10G 3/00* (2006.01)
  *C10B 53/00* (2006.01)

(56) References Cited

U.S. PATENT DOCUMENTS

| | | |
|---|---|---|
| 1,766,132 A | 6/1930 | Kraul |
| 1,878,581 A | 9/1932 | Ab-Der-Halden |
| 1,963,554 A | 6/1934 | McDill |
| 2,121,463 A | 6/1938 | Wisdom |
| 2,473,183 A | 6/1949 | Watson |
| 2,719,135 A | 9/1955 | Wood |
| 2,853,969 A | 9/1958 | Drewett |
| 3,174,895 A | 3/1965 | Gibson et al. |
| 3,179,605 A | 4/1965 | Ohsol |
| 3,187,089 A | 6/1965 | Cosby et al. |
| 3,187,502 A | 6/1965 | Stover |
| 3,203,849 A | 8/1965 | Katz et al. |
| 3,275,488 A | 9/1966 | Bailey et al. |
| 3,317,338 A | 5/1967 | Batchelor |
| 3,399,969 A | 9/1968 | Bokros et al. |
| 3,433,468 A | 3/1969 | Schoenlaub |
| 3,492,197 A | 1/1970 | Olstowski et al. |
| 3,503,118 A | 3/1970 | Criscione et al. |
| 3,513,014 A | 5/1970 | Inoue |
| 3,607,541 A | 9/1971 | Tombrel |
| 3,728,797 A | 4/1973 | Worden, Sr. et al. |
| 3,822,218 A | 7/1974 | Whittaker et al. |
| 3,823,224 A | 7/1974 | Laman et al. |
| 3,966,487 A | 6/1976 | Crane et al. |
| 3,978,199 A | 8/1976 | Maruhnic et al. |
| 3,996,022 A | 12/1976 | Larsen |
| 4,002,581 A | 1/1977 | Dolce |
| 4,003,683 A | 1/1977 | Powell, Jr. et al. |
| 4,038,100 A | 7/1977 | Haberman |
| 4,089,934 A | 5/1978 | Akiyoshi et al. |
| 4,101,464 A | 7/1978 | Kamens et al. |
| 4,108,767 A | 8/1978 | Cooper |
| 4,221,608 A | 9/1980 | Beckman |
| 4,250,158 A | 2/1981 | Solbakken et al. |
| 4,284,616 A | 8/1981 | Solbakken et al. |
| 4,308,103 A | 12/1981 | Rotter |
| 4,333,751 A | 6/1982 | Iwamura et al. |
| 4,411,778 A | 10/1983 | Venable |
| 4,452,154 A | 6/1984 | Kono et al. |
| 4,458,095 A | 7/1984 | Wingfield, Jr. et al. |
| 4,532,319 A | 7/1985 | Wendling |
| 4,539,102 A | 9/1985 | Boston et al. |
| 4,581,041 A | 4/1986 | Covell et al. |
| 4,626,258 A | 12/1986 | Koppelman |
| 4,648,328 A | 3/1987 | Keough |
| 4,686,008 A | 8/1987 | Gibson |
| 4,732,092 A | 3/1988 | Gould |
| 4,740,270 A | 4/1988 | Roy |
| 4,787,321 A | 11/1988 | Schnellbacher et al. |
| 4,839,151 A | 6/1989 | Apffel |
| 4,849,051 A | 7/1989 | Ahne et al. |
| 4,895,083 A | 1/1990 | McDilda |
| 4,900,401 A | 2/1990 | Horton |
| 4,919,686 A | 4/1990 | Edwards |
| 4,926,765 A | 5/1990 | Dreizler et al. |
| 4,982,027 A | 1/1991 | Korff et al. |
| 4,983,278 A | 1/1991 | Cha et al. |
| 4,983,782 A | 1/1991 | Merz et al. |
| 5,037,628 A | 8/1991 | Fader |
| 5,057,189 A | 10/1991 | Apffel |
| 5,098,784 A | 3/1992 | Ichikawa et al. |
| 5,101,739 A | 4/1992 | Nance et al. |
| 5,101,742 A | 4/1992 | Sowards et al. |
| 5,157,176 A | 10/1992 | Munger |
| 5,158,983 A | 10/1992 | Stapp |
| 5,167,772 A | 12/1992 | Parker, Sr. |
| 5,225,044 A | 7/1993 | Breu |
| 5,229,099 A | 7/1993 | Roy |
| 5,236,992 A | 8/1993 | Bush |
| 5,258,101 A | 11/1993 | Breu |
| 5,272,126 A | 12/1993 | Ichikawa et al. |
| 5,320,820 A | 6/1994 | Yoshii et al. |
| 5,323,714 A | 6/1994 | Cox |
| 5,326,919 A | 7/1994 | Paisley et al. |
| 5,329,020 A | 7/1994 | Kalota et al. |
| 5,342,421 A | 8/1994 | Breu |
| 5,395,404 A | 3/1995 | Burckhalter |
| 5,411,714 A | 5/1995 | Wu et al. |
| 5,423,950 A | 6/1995 | Avetisian et al. |
| 5,427,022 A | 6/1995 | Gardner |
| 5,427,762 A | 6/1995 | Steinberg et al. |
| 5,433,018 A | 7/1995 | Avetisian et al. |
| 5,435,890 A | 7/1995 | Munger |
| 5,437,237 A | 8/1995 | Digre |
| 5,449,438 A | 9/1995 | Jagau et al. |
| 5,451,297 A | 9/1995 | Roy |
| 5,452,670 A | 9/1995 | Towne |
| 5,504,267 A | 4/1996 | Platz |
| 5,506,274 A | 4/1996 | Brown |
| 5,628,260 A | 5/1997 | Rongved |
| 5,628,261 A | 5/1997 | Beckstead et al. |
| 5,636,580 A | 6/1997 | Kanis |
| 5,653,183 A | 8/1997 | Hansen et al. |
| 5,693,188 A | 12/1997 | Donnohue et al. |
| 5,720,232 A | 2/1998 | Meador |
| 5,720,854 A | 2/1998 | Avetisian et al. |
| 5,726,118 A | 3/1998 | Ivey et al. |
| 5,728,361 A | 3/1998 | Holley |
| 5,783,046 A | 7/1998 | Flanigan |
| 5,806,441 A | 9/1998 | Chung |
| 5,827,352 A | 10/1998 | Altman et al. |
| 5,836,524 A | 11/1998 | Wang |
| 5,851,246 A | 12/1998 | Bishop et al. |
| 5,853,687 A | 12/1998 | Morlec et al. |
| 5,854,173 A | 12/1998 | Chang et al. |
| 5,894,012 A | 4/1999 | Denison |
| 5,901,653 A | 5/1999 | Jennebach et al. |
| 5,961,946 A | 10/1999 | Takegawa et al. |
| 6,019,829 A | 2/2000 | Omae et al. |
| 6,046,370 A | 4/2000 | Affolter et al. |
| 6,048,374 A | 4/2000 | Green |
| 6,099,818 A | 8/2000 | Freund et al. |
| 6,103,205 A | 8/2000 | Wojtowicz et al. |
| 6,149,881 A | 11/2000 | Hanson et al. |
| 6,221,329 B1 | 4/2001 | Faulkner et al. |
| RE37,229 E | 6/2001 | Behrmann et al. |
| 6,271,427 B1 | 8/2001 | Ershag |
| 6,277,350 B1 | 8/2001 | Gerspacher |
| 6,294,135 B1 | 9/2001 | Joo et al. |
| 6,305,302 B2 | 10/2001 | Kleiss |
| 6,321,666 B1 | 11/2001 | Tigonen |
| 6,322,613 B1 | 11/2001 | Wojtowicz et al. |
| 6,358,042 B1 | 3/2002 | Moriguchi |
| 6,372,948 B1 | 4/2002 | Flanigan |
| 6,391,274 B1 | 5/2002 | Vogler et al. |
| 6,407,180 B1 | 6/2002 | Wideman et al. |
| 6,443,078 B2 | 9/2002 | Cabrini |
| 6,525,105 B1 | 2/2003 | Udagawa et al. |
| 6,538,166 B1 | 3/2003 | Mahjoob |
| 6,657,095 B1 | 12/2003 | Holden et al. |
| 6,736,940 B2 | 5/2004 | Masemore et al. |
| 6,758,150 B2 | 7/2004 | Ballantine et al. |
| 6,830,597 B1 | 12/2004 | Green |
| 6,901,868 B2 * | 6/2005 | Hornung ............... C10B 7/10 110/229 |
| 6,941,879 B2 | 9/2005 | Hahn et al. |
| 6,978,843 B2 | 12/2005 | Gleim et al. |
| 7,000,551 B2 | 2/2006 | Cole et al. |
| 7,037,410 B2 | 5/2006 | Flanigan |
| 7,101,463 B1 | 9/2006 | Weinecke et al. |
| 7,101,464 B1 | 9/2006 | Pringle |

(56) References Cited

U.S. PATENT DOCUMENTS

| | | |
|---|---|---|
| 7,108,767 B2 | 9/2006 | Noto |
| 7,166,658 B2 | 1/2007 | Harrison et al. |
| 7,168,682 B2 | 1/2007 | Nanba et al. |
| 7,194,962 B2 | 3/2007 | Edmondson |
| 7,288,620 B2 | 10/2007 | Galewski |
| 7,329,329 B2 | 2/2008 | Masemore et al. |
| 7,344,622 B2 | 3/2008 | Grispin |
| 7,347,982 B2 | 3/2008 | Denison |
| 7,375,255 B2 | 5/2008 | Lee |
| 7,416,641 B2 | 8/2008 | Denison |
| 7,431,909 B1 | 10/2008 | Rumpf et al. |
| 8,888,961 B2 * | 11/2014 | Horn .................. C09C 1/482 201/25 |
| 2002/0117388 A1 | 8/2002 | Denison |
| 2002/0119089 A1 | 8/2002 | Masemore et al. |
| 2002/0159931 A1 | 10/2002 | Chen |
| 2003/0114722 A1 | 6/2003 | Bradley |
| 2004/0182001 A1 | 9/2004 | Masemore et al. |
| 2005/0000162 A1 | 1/2005 | Bishop et al. |
| 2005/0023124 A1 | 2/2005 | Karpetsky et al. |
| 2006/0163053 A1 | 7/2006 | Ershag |
| 2006/0211899 A1 * | 9/2006 | Lee .................. B29B 17/04 585/241 |
| 2006/0278141 A1 | 12/2006 | Edmondson |
| 2007/0286779 A1 * | 12/2007 | Steinmeyer .............. C09C 1/56 422/255 |
| 2008/0029380 A1 | 2/2008 | Kim |
| 2008/0128259 A1 | 6/2008 | Kostek et al. |
| 2008/0200738 A1 | 8/2008 | Grispin |
| 2008/0202913 A1 | 8/2008 | Kolev et al. |
| 2008/0223268 A1 * | 9/2008 | Gehring .................. F23G 5/027 110/336 |
| 2008/0286192 A1 | 11/2008 | Hamby et al. |
| 2008/0286574 A1 | 11/2008 | Hamby et al. |
| 2009/0100701 A1 | 4/2009 | Ulrich |
| 2009/0200150 A1 | 8/2009 | Jeon |
| 2009/0211892 A1 | 8/2009 | Cunningham et al. |
| 2011/0083953 A1 | 4/2011 | Horn et al. |

FOREIGN PATENT DOCUMENTS

| | | |
|---|---|---|
| EP | 2488605 A1 | 8/2012 |
| GB | 479 977 A | 2/1938 |
| WO | 8808020 A1 | 10/1988 |
| WO | 0226914 A2 | 4/2002 |
| WO | 2011047068 A1 | 4/2011 |

OTHER PUBLICATIONS

CN 201080056905.0 filed Jun. 14, 2012 Second Office Action dated Jan. 30, 2014.

CN 201080056905.0 filed Jun. 14, 2012 Third Office Action dated May 14, 2014.

PCT/US2010/052530 filed Oct. 13, 2010 International Preliminary Report on Patentability dated Apr. 17, 2012.

PCT/US2010/052530 filed Oct. 13, 2010 International Search Report dated Feb. 10, 2011.

PCT/US2010/052530 filed Oct. 13, 2010 Written Opinion dated Feb. 10, 2011.

U.S. Appl. No. 12/904,016, filed Oct. 13, 2010 Non-Final Office Action dated Nov. 8, 2013.

CN 201410838399.0 filed Dec. 29, 2014 Office Action dated Aug. 22, 2016.

EP 10824035.9 filed Feb. 5, 2013 Extended European Search Report dated Aug. 12, 2016.

CA 2,776,547 filed Apr. 3, 2012 Office Action dated Apr. 25, 2017.

CN 201410838399.0 filed Dec. 29, 2014 Office Action dated Apr. 13, 2017.

Su Yaxin et al. "Introduction to New Energy and Renewable Energy" Chemical Industry Press, pp. 219-222, Mar. 31, 2006.

Tiantao—"Reduction and Control Technology of Greenhouse Gas in Environmental Engineering Field" Chemical Industry Press, pp. 75-77 and 86-88, Mar. 31, 2009.

* cited by examiner

FIG. 1A
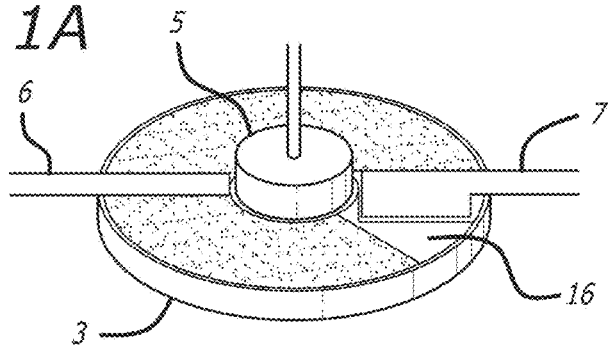
FIG. 1B
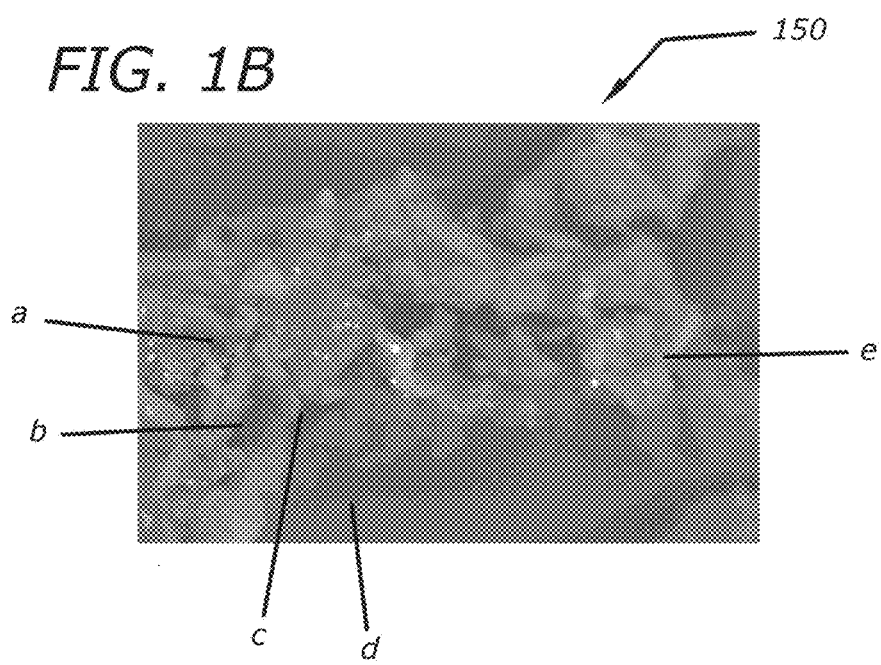
| Spot | Weight, % | | | | | |
|---|---|---|---|---|---|---|
| | Zn | Si | S | Ti | Al | O |
| a | 50 | 1.3 | 13 | | 1 | 34 |
| b | 2.4 | 25 | 3.5 | | 18 | 51 |
| c | 16 | | 3.9 | | | 2 |
| d | 5.2 | 17 | 4.1 | 12 | 14 | 48 |
| e | 11 | 1.4 | 5.4 | | | |
FIG. 1C

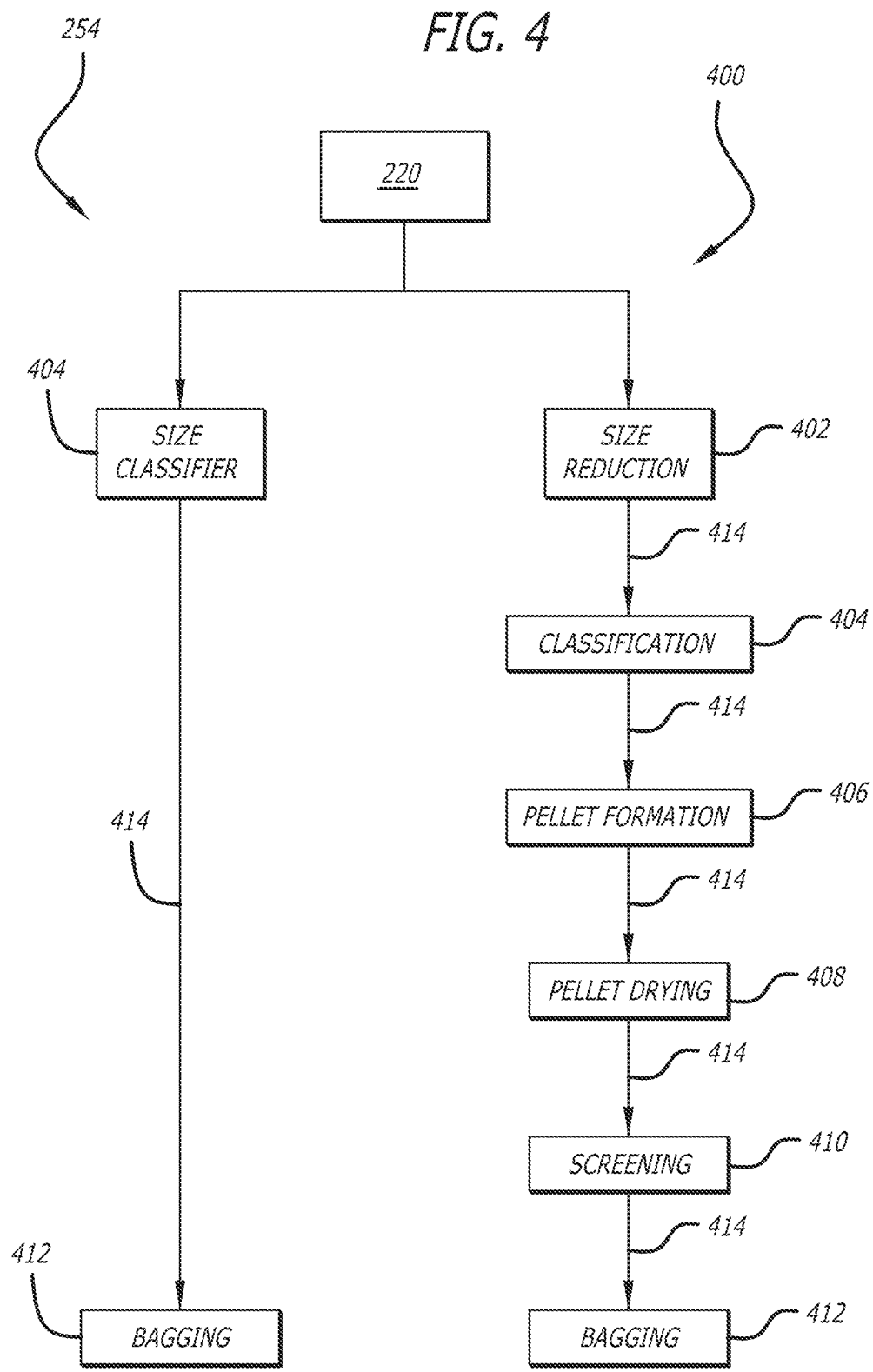

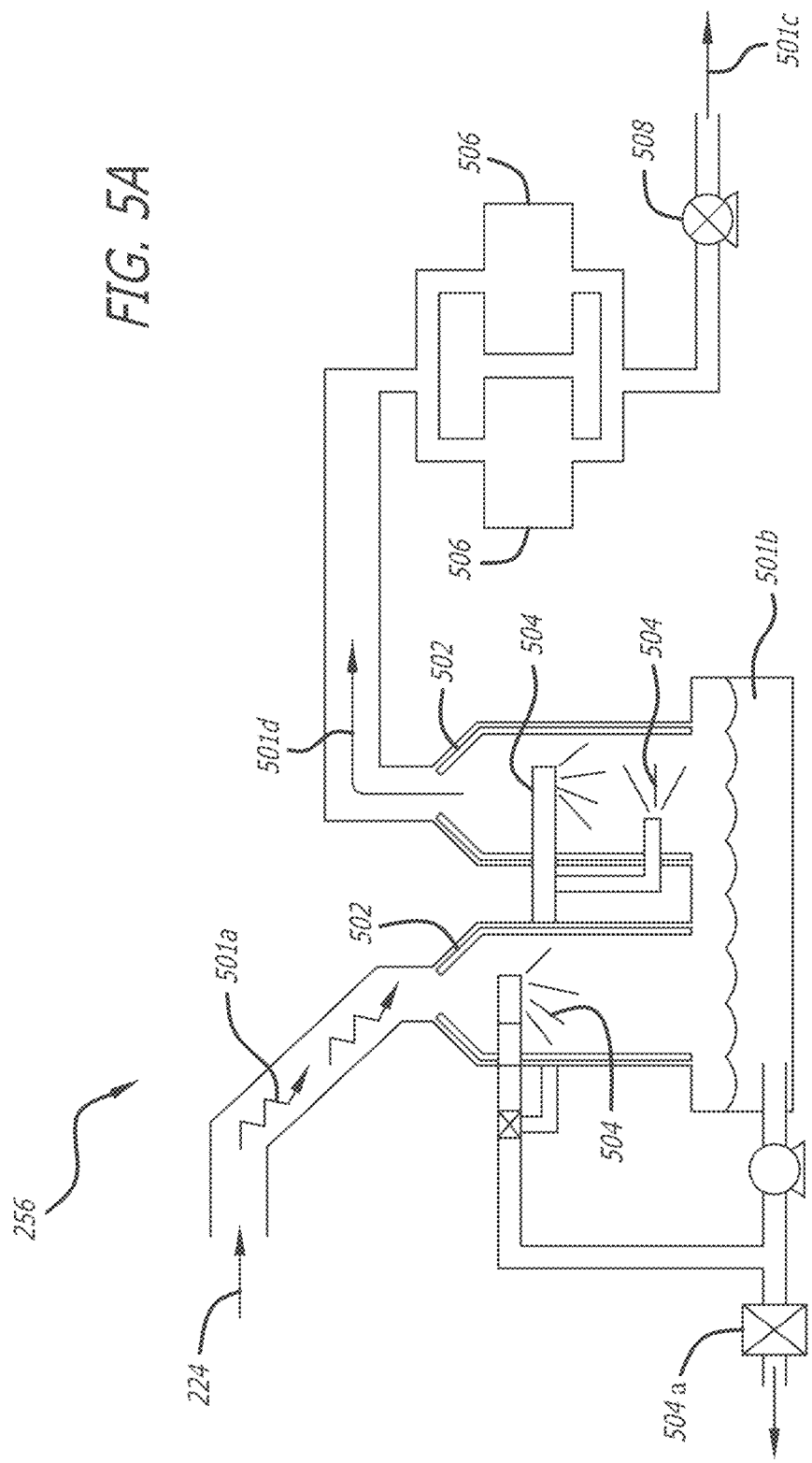

PYROLYSIS PROCESS AND PRODUCTS

PRIORITY

This application is a continuation of U.S. patent application Ser. No. 12/904,016, filed Oct. 13, 2010, now U.S. Pat. No. 8,888,961, which claims the priority benefit of U.S. Provisional Application 61/251,721, filed Oct. 14, 2009, each of which is incorporated by reference in its entirety into this application.

BACKGROUND

Pyrolysis is a thermal process for breaking down hydrocarbon materials in the absence of oxygen into smaller constituent materials, including carbon and hydrocarbon compounds with a wide range of molecular weights and gases. When feedstock consists of organic polymers, pyrolysis causes the polymer backbone to decompose and the products can include carbon char and condensable and non-condensable gases.

During tire pyrolysis, chemical bonds within the rubber compounds are broken down, creating a mixture of organic compounds and non-condensable gases. Carbon black, present as a major component in the tire polymer matrix, is freed. Other inorganic compounds, such as silicon dioxide, zinc oxide and aluminum oxide, present within the tire are also freed from the polymer matrix. Organic compounds within the matrix, consisting of larger carbon chains (C6 and larger), sublime to a gaseous state at normal operating temperatures and include a mixture of aromatic, aliphatic and olefinic hydrocarbons. Non-condensable gases such as methane, ethane, propane, hydrogen, carbon monoxide and hydrogen sulfide are also formed during pyrolysis. Additional carbon black, in minor amounts, is also formed when carbon is split off from the polymeric chains and is carbonized. The end products of a tire pyrolysis process typically include carbon black, pyrolysis oil, non-condensable gases, and inorganic ash.

Several problems are believed to hinder the technical and commercial viability of commercial pyrolysis systems. For example, the pyrolysis process and the resulting products are highly dependent on a number of variables including the type, size, and shape of feed material; pyrolysis conditions such as the pyrolysis rate, the processor type, thermal and gas flow gradients within the processor; gas and carbon co-mixing and exiting the processor; and methods for effectively recovering and separating desired products.

Further, the pyrolysis gas stream exiting from the pyrolysis system typically contains a mixture of condensable and non-condensable gases and a small portion of fluidized carbon black and inorganic ash particles, which become entrained in the gas stream. Certain chemicals in the gas, particularly the olefins and aromatics, have an affinity for the carbon particles and begin to condense on the carbon surface. Other chemicals in the gas, particularly polar compounds, will condense on the inorganic ash particles. This leads to carbon and inorganic ash mixtures that will adhere on surfaces, causing undesired buildup throughout the system. This can eventually lead to excessive fouling and plugging. Ultimately, this can lead to added maintenance and downtime for cleaning. If the condensable pyrolysis-gases are to be collected by methods such as condensation, the pyrolysis oil or pyrolysis gas contaminated with carbon black and inorganic ash can be an unacceptable contaminant, degrading product purity. If the light, non-condensable gases are to be collected or burned, the entrained carbon and inorganic ash will ultimately foul tubing, valves, pumps, compressors, burners or other equipment.

The following provide examples of pyrolysis systems: U.S. Pat. No. 7,329,329 issued Feb. 12, 2008; U.S. Pat. No. 6,736,940 issued May 18, 2004; U.S. Pat. No. 6,221,329 issued Apr. 24, 2001; U.S. Pat. No. 6,149,881 issued Nov. 21, 2000; U.S. Pat. No. 6,048,374 issued Apr. 11, 2000; U.S. Pat. No. 5,225,044 issued Jul. 6, 1993; U.S. Pat. No. 5,037,628 issued Aug. 6, 1991. Each of the foregoing patents is incorporated by reference in its entirety into this application.

The following provide examples of further post-processing and uses for the resulting products of pyrolysis: U.S. Pat. No. 7,416,641 issued Aug. 26, 2008; U.S. Pat. No. 7,101,463 issued Sep. 5, 2006; U.S. Pat. No. 6,322,613 issued Nov. 27, 2001; U.S. Pat. No. 6,103,205 issued Aug. 15, 2000; U.S. Pat. No. 5,894,012 issued Apr. 13, 1999; U.S. Pat. No. 4,839,151 issued Jun. 13, 1989. Each of the foregoing patents is incorporated by reference in its entirety into this application.

The formation of zinc sulfide during pyrolysis of tires is also reported in the following literature, which is incorporated by reference in its entirety into this application: The Vacuum Pyrolysis of used tires. End use for the oil and carbon black products; C Roy, A Chaala, and H. Darmstadt; Journal of Analytical and Applied Pyrolysis, 51 (1999) 201-221.

BRIEF SUMMARY

A method of pyrolysis of a carbonaceous feedstock, includes introducing a carbonaceous feedstock into a pyrolysis processor comprising a vertical rotary tray processor, heating the feedstock to a temperature above about 790° F., removing a carbon material from a bottom portion of the pyrolysis processor, and removing a pyrolysis gas from a top portion of the pyrolysis processor.

The resulting solid material may further be processed by size reducing the carbon material to create a reduced carbon product generally under 20 micrometers, classifying the reduced carbon product by size to remove particles over an undesirable size to provide a generally uniform carbon product, pelletizing the generally uniform carbon product by mixing the generally uniform carbon product with a binder, forming pellets, and drying the pellets; and screening the pellets for a desired size distribution.

The resulting gases may further be processed to separate the desired pyrol oils and non-condensable gases by passing the pyrolysis gas from the pyrolysis processor through a first condensing tower comprising a first filter and a first condensing surface, wherein a first condensed oil is condensed and captured in a first oil tank, and a portion of the first condensed oil is re-circulated through a first condensing tower, passing a pyrolysis gas from the first condensing tower through a second condensing tower comprising a second filter and a second condensing surface, wherein a second condensed oil is condensed and captured in a second oil tank, and a portion of the second condensed oil is re-circulated through the second condensing tower, and passing a pyrolysis gas from the second condensing tower through a third condensing tower comprising a third condensing surface, wherein a third condensed oil is condensed and captured in a third oil tank, and a portion of the third condensed oil is re-circulated through the third condensing tower.

BRIEF DESCRIPTION OF THE DRAWINGS

FIG. 1A illustrates an exemplary rotator tray of the pyrolysis processor of FIG. 1 according to embodiments as described herein.

FIG. 1B illustrates exemplary TDCB material from the processor of FIG. 1.

FIG. 1C provides the material distribution of the associated spots on a percent by weight basis of FIG. 1B.

FIG. 4 illustrates an exemplary system for processing the solid materials from the pyrolysis process of FIG. 2.

FIGS. 5A and 5B illustrate exemplary systems for processing the gases from the pyrolysis process of FIG. 2.

DETAILED DESCRIPTION

The following detailed description illustrates by way of example rather than limitation the principles of the invention. This description enables one skilled in the art to make and use the invention, and describes several embodiments, adaptations, variations, alternatives and uses of the invention, including what is presently believed to be the best mode for carrying out the invention. It should be understood that the drawings are diagrammatic and schematic representations of exemplary embodiments of the invention, and are not limiting of the present invention nor are they necessarily drawn to scale.

Pyrolysis offers great promise for effective management of hydrocarbon-containing waste materials. The development of a commercially viable pyrolysis process is desirable because as the number and quantity of scrap tires grows, hydrocarbon resources continue to shrink. Scrap automobile tires are of particular concern and interest for pyrolysis. In the United States alone, more than 300 million tires are discarded annually, representing about 2% of the nation's solid waste, containing an estimated 90 million MMBTU's of energy. Additional waste materials that may benefit from commercially viable pyrolysis are plastics, including discarded electronics.

Embodiments of the present invention may be applied to pyrolysis systems generally, and specifically to tire pyrolysis systems. For example, embodiments of the described systems and processes are used in a continuous-process thermal conversion of steel-free tire-shreds to carbon black, oil, and non-condensable gases. The described embodiments generally refer to steel-free tire shreds as the preferred feedstock, but the system is not so limited and may include tire shreds containing steel reinforcement. Additionally, embodiments described herein refer to tire shreds, but the system and processes may be used to pyrolyze other organic materials such as plastics, wood, other rubber materials, or other organic materials.

Figure 1:
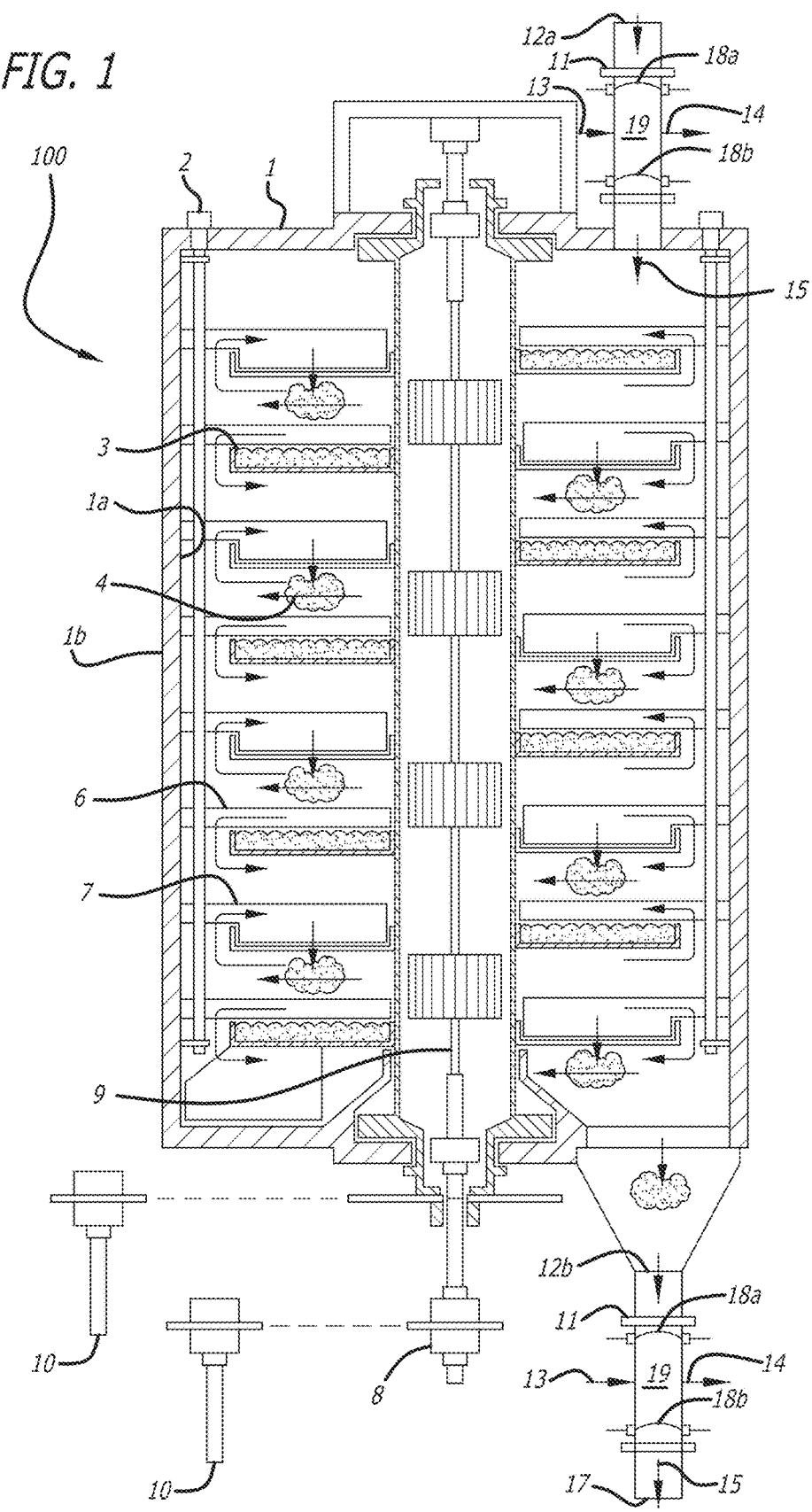
FIG. 1 illustrates an exemplary pyrolysis processor to convert carbonaceous feedstock to carbon black, mineral powders, oil, and non-condensable gases according to embodiments as described herein.

FIG. 1 illustrates an exemplary pyrolysis processor to convert feedstock, such as tire shreds, to carbon black, mineral powders, oil, and non-condensable gases according to embodiments as described herein. In an exemplary embodiment, a vertical pyrolysis processor is used to transport tire shreds through a plurality of vertically displaced trays. The incoming feedstock is introduced at the top of the reactor and gravity-dropped between trays. The solid material is extracted from the bottom of the processor, while the gases are extracted from the top portion.

In one embodiment, a vertical tray processor 100 is used to allow continuous processing in a uniform processing environment. The vertical tray processor 100 includes an inlet feed 12a through a top surface of the cylindrical furnace 1 and an outlet feed 12b through a bottom surface of the cylindrical furnace 1. The vertical tray processor 100 includes heating elements 2 to provide sufficient heat for pyrolysis. Generally horizontal trays 3 are displaced vertically through the cylindrical furnace 1 and support the feedstock during the pyrolysis process. The trays 3 are aligned with and are supported by the rotating drive shaft 9 along a central axis of the cylindrical furnace 1. This rotating shaft 9 is driven by the motorized drive shaft assembly 10, which may include sprockets, chain, gears, etc. to rotate the drive shaft at the desired speeds while maintaining low vibration tuning. The rotation of the trays 3 about the central axis of the cylindrical furnace 1 subject the feedstock to heat transfer through radiation, conduction, and convection. Rotation of the trays also aids in maintaining a uniform temperature of the trays to avoid distortion and warping of the trays themselves. The feedstock is gravity dropped between trays to the bottom of the vertical tray processor 100 and to the outlet feed 12b. This process continues until the pyrolysis reaction of initial material is complete. The resulting bulk solids, consisting of carbon black, mineral oxides, and minor amounts of high temperature reinforcing fibers, herein referred to subsequently in the aggregate as Tire-Derived Carbon Black ("TDCB"), may then collect at the bottom of the vertical tray processor 100 to be removed through product exit 17. In one embodiment, the cylindrical furnace is approximately 10-25 feet high, with trays spaced vertically approximately 4-20 inches.

In an exemplary process, the shredded tire pieces exceed 790° F. to fully pyrolyze. Additionally, in an exemplary embodiment, a thermal gradient is used to drive the pyrolysis reactions and improve the time required for full pyrolysis while overcoming the poor heat transfer characteristics of both rubber and TDCB. The temperature gradient is maintained between 1 and 40° F. variation by controlling feedstock flow and by adjusting the speed of the internal radial fan. The thermal processor is optimally operated in the range of approximately 825° F. to 980° F., where the maximum amount of pyrolysis oils will be produced and the residual oil content in the TDCB will be less than 3% by weight. Higher operating temperatures do not improve oil production and reduces carbon black production. Higher temperatures thermally decompose oil compounds to create lighter molecular weight compounds, and also produce more non-condensable gases such as methane and hydrogen. Lower operating temperatures increase the time for pyrolysis and leave residual oil content in the carbon black. It should be appreciated however, that the operating temperatures might be varied depending on the desired product. Accordingly, the above preference of operating temperature is not considered limiting to the present disclosure.

FIG. 1A illustrates an exemplary rotator tray 3, including a stationary leveler arm 6 to level the solids, a stationary rake 7 and a slot 16 through which the remaining solids drop to the next rotator tray 3. In one embodiment, material is deposited on a rotator tray 3 from a vertically higher rotator tray or from the inlet feed 12a. The deposited solids encounter a stationary leveler arm 6 to level out shreds on the trays 3 as they rotate to permit uniform, efficient pyrolysis. This results in a uniform layer of shreds and permits consistent heating and pyrolysis. The leveler arm 6 provides a gap over the rotating tray 3 to permit the solid material to pass. The gap depends on the size of the initial feedstock and the progression of the pyrolysis at each level of the processor. Accordingly, the gaps between a leveler arm 6 and associated rotating tray 3 may be the same for each tray 3 or may vary between successively lower trays. In one embodiment, the leveler is spaced to create a material layer on the rotating tray of approximately 1 to 6 inches. The leveled solids then encounter a stationary rake 7 that causes the solids to fall by gravity through slot 16 and onto the rotating tray 3 below.

The stationary leveler arm 6, the stationary rake 7 for feed drop and the slot 16 of each rotating tray 3 is rotationally aligned to provide the maximum uniform heating during the rotation of that tray. As illustrated, the stationary leveler arm 6 is opposite the stationary rake 7 for illustration only. The stationary leveler arm 6 is preferably positioned so that the dropped materials encounter the stationary leveler arm 6 as soon as the material is deposited on a tray to provide maximum uniform heating. Also as illustrated, the stationary rake 7 of adjacent trays is positioned opposite the processor for illustrative purposes only. Stationary rake 7 of each successive rotating tray 3 may be rotationally misaligned so that the solid material may rotate at least ¾ of a revolution before the solid material is scraped into the next slot 16 by the next stationary rake 7. The slots 16 of each successive rotation tray 3 may also be rotationally misaligned so that the material from a preceding tray is deposited rotationally behind the slot of the tray on which it is deposited. In other words, the slot of a lower tray precedes the slot of a higher tray in the direction of rotation. By this arrangement, when the stationary leveler arm 6 spreads the material, solid material is not prematurely dropped through the slot.

The falling stream of solids between trays 3 permits the materials to intimately contact the pyrolysis gases 4. The physical drop to the next tray removes pyrolysis decomposition products from the solids surface, exposing unpyrolyzed rubber for decomposition. The solid material is also physically agitated during the rake, drop, and leveling to further expose unpyrolyzed rubber for decomposition. Removal of the products of pyrolysis from the surface of the tire shreds optimizes thermal heat transfer to the remaining solids via convection, conduction, and radiation. This process results in a solid carbon black powder, TDCB, which is uniform in size distribution and exhibits minimal residual oil content. In addition, the exposure of the solids to the pyrolysis gases as the material falls between trays allows the zinc oxide contained in the char to react with the sulfur compounds in the pyrolysis gases to form zinc sulfide. This reaction ($ZnO+S \rightarrow ZnS+\frac{1}{2}$) captures a portion of the Sulfur, reducing the Sulfur content in the condensed oil product. FIG. 1B illustrates exemplary TDCB material 150. FIG. 1C provides the material distribution of the associated spots on a percent by weight basis. Spots a, c, and e are predominately zinc and sulfur; spot b is predominately aluminum and silicon with minor amounts of zinc and sulfur; and spot d is predominately titanium, aluminum, and silicon with minor amounts of zinc and sulfur. Spot e has a composition representing zinc sulfide with a 2:1 ratio of zinc to sulfur, consistent with the stoichiometry of zinc sulfide produced by the above reaction.

The vertical tray processor 100 includes a heating source 2 to provide the necessary temperatures for pyrolysis. The exemplary heating source is an electrical heating element positioned adjacent an interior wall of the cylindrical furnace 1. The electrical heating element may therefore be positioned between the rotation trays 3 and the cylindrical furnace 1 interior wall to provide radiative heat to the furnace interior. The solids are also heated by the circulating gases, which provide convective heat transfer to the bed of tire shreds and help maintain uniform temperatures in the released carbon black and minerals within approximately +/−1° F. The tire shreds are therefore subjected to a more uniform temperature throughout processing, creating efficient pyrolysis and a uniform, reproducible product. This method of heating, coupled with the air locks at the entry and exit of the processor, also maintains an atmosphere inside the vessel at less than approximately 0.5% oxygen without the use of purge nitrogen. This minimizes the amount of entrained carbon black and minerals in the circulating gas. Therefore, the operating costs are lowered and thermal efficiency optimized. Other heating sources may be used in place of the illustrated electrical heating elements.

Alternatively, the vertical tray processor 100 may be heated indirectly by combusting a fuel source within an annular space within the walls of the cylindrical furnace 1. For example, natural gas, heating oil, or pyrolysis oil and passing the combustion gas products through an annular space between the interior wall 1a and exterior wall 1b of the pyrolysis processor. In this method, the interior wall 1a may be heated and provide radiative heat transfer to the trays 3 and solid material, and conductive and radiative heat to the circulating pyrol gases. This method of providing heat minimizes the circulating volume of gases within the pyrolysis processor, thus minimizing the amount of carbon black entrained in the pyrol gases.

In an exemplary embodiment, gas flow 4 is maintained across the solids in trays 3 by a center turbo fan 5 driven by a drive shaft for the turbines 8. The drive shaft 8 may be motorized by drive shaft assembly 10, which may include sprockets, chain, gears, etc. to rotate the drive shaft at the desired speeds while maintain low vibration tuning. A radial turbo fan 5 gently moves the pyrolysis gases 4 across the solids on each tray 3 to provide convective heat transfer. The turning of the bed, and movement of pyrolysis gases across the bed, creates a uniform temperature throughout the bed and results in consistent product composition and physical characteristics. Further, the gentle rolling of the freed carbon black particles allows the particles to grow by mechanisms of aggregation and agglomeration to sizes greater than 20 microns, substantially reducing dusting and entrainment of carbon black with the pyrolysis gases.

The pyrolysis processor 100 may also include airlocks 11 and oxygen purge to provide a substantially oxygen free environment within the processor. In one embodiment, nitrogen purging is used to remove oxygen-containing air, which occupies the void fraction between tire shred pieces and is absorbed in the tire shreds. Removing the oxygen from the material may prevent thermal oxidation (i.e. burning) and is beneficial from a process, safety, and environmental standpoint. Preferably, the oxygen level is maintained at or below 1% during the pyrolysis process. The processor may operate under generally neutral pressure, for example, +/−3 inches WC (Water Column). Although different pressures may be used, negative pressures are not preferred as they can allow the in-leakage of air, and positive pressures are not preferred as they can allow the escape of flammable and explosive gases through system gaskets and seals. In one embodiment, the pressure may cycle from slightly negative, to neutral, to slightly positive as a result of pressure variations caused by nitrogen entering from the processor inlet and outlet air locks. In one embodiment, the pressure in the processor may be controlled by a suction fan or blower in closed loop control with one or more pressure sensors on the processor vessel.

In one embodiment, at the inlet feed 12a and outlet feed 12b, the solid material may be deoxygenated by the nitrogen purge system 13 using purge gas 14 resulting in material leaving the airlock at 15 that is purged of oxygen or furnace gases. The process is called "degassing." The airlocks and nitrogen purge may include an inlet valve 18a and a holding chamber 19 and an outlet valve 18b. The airlock maintains a seal to keep oxygen out of the furnace 1. The holding chamber allows controlled amounts of shreds to be purged with nitrogen to remove air contained in the void fraction between the shreds.

Embodiments, as described herein, are preferably used for continuous feed systems. However, embodiments may also be applicable to batch feed systems. In batch feed systems, a retort is charged with a fixed amount of feedstock and is typically loaded at a temperature low enough that combustion of the feed does not occur. The retort is sealed, purged of oxygen either by vacuum or with an inert gas, and heated using a pre-determined temperature profile. Feed material is pyrolyzed and pyrolysis gases are extracted. After the required residence time in the retort and sufficient cooling is achieved, the retort is opened and solid products are collected. Alternatively, in continuous feed systems feedstock is introduced to a thermal processor, conveyed through the heated system, and then pyrolyzed using a pre-determined temperature profile and feed rate. As feed material is pyrolyzed, gases are extracted and collected. Solid products are produced and conveyed out of the processor. The solids are typically cooled by a heat exchange mechanism and continuously discharged.

Figure 2A:
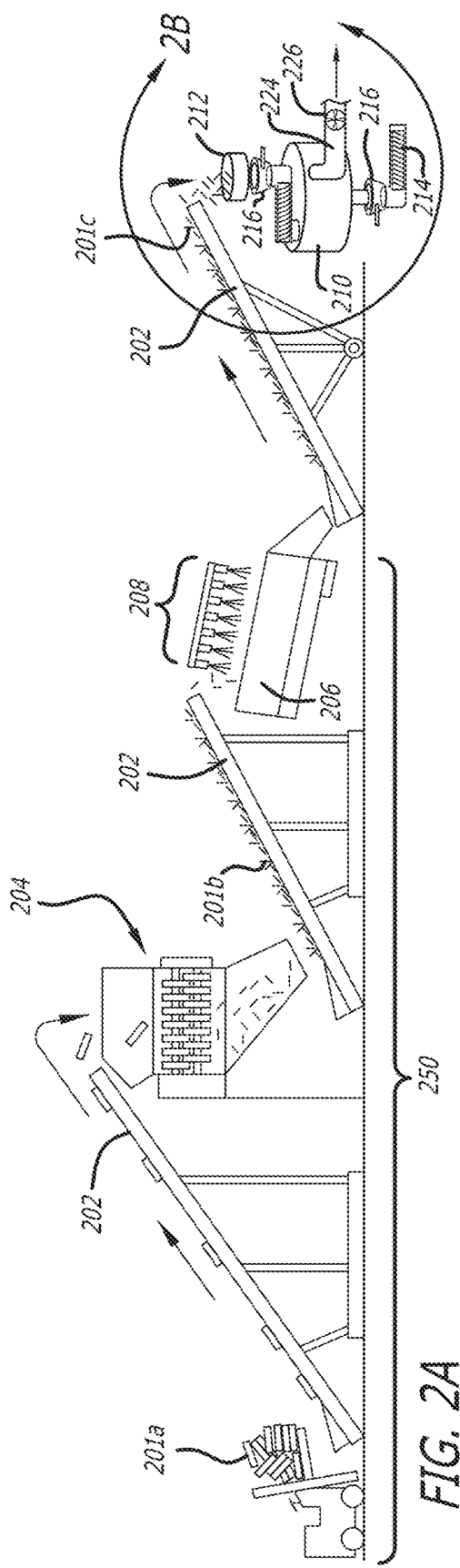
FIGS. 2A and 2B illustrate an exemplary continuous pyrolysis process to thermally convert carbonaceous feedstock to carbon black combined with mineral powders, oil, and non-condensable gases according to embodiments as described herein.

FIG. 2A illustrates an exemplary continuous pyrolysis process 200 to thermally convert tires to carbon black combined with mineral powders, oil, and non-condensable gases. In an exemplary embodiment, tires are shredded in-line with the pyrolysis process. The exemplary process includes preparing the tires for pyrolysis 250, pyrolyzing the tires 252, refining the gas output including the condensable oils 254, and refining the TDCB output 256. During preparation 250, the tires are shredded, dried, and transferred to the pyrolysis processor. During pyrolysis 252, the tire shreds may then be heated to a temperature sufficient for pyrolysis in an oxygen-deprived environment to avoid burning of the organics at normal operating temperatures. The absence of oxygen also avoids hazardous conditions of flammable gases in the presence of oxygen while above their auto-ignition temperatures. Processing of the materials solids 256 may include removing the TDCB from the processor, cooling, and separating the material. The pyrolysis gases may also be removed from the processor and further treated for the desired products 254. For example, the system may also include various processes to condense the pyrolysis oils from the non-condensable gases. The non-condensable gases represent a fuel gas that may then be burned or used as fuel in generators to produce electricity.

In an exemplary embodiment the tires 201a are shredded 204, dried 206, and transferred 202 in-line with the pyrolysis process 252. For example, tires 201a are transported to a conveyor 202 that introduces the tires 201a to a shredder 204. The tires 201a may be cut in a shredder 204 where water is added to cool the blades. Wet shreds 201b may then be transferred by conveyor 202 through a dryer 206. The dryer 206 may be a gas-fired or steam-fired dryer 208, where the shreds 201b are transferred through a fluid bed, dried and de-dusted of small bits of rubber and fiber, and sent to the pyrolysis processor 210 for decomposition. In one embodiment, the heat source for the gas-fired or steam-fired dryer is from the non-condensable gases derived from the pyrolysis process as described herein, or steam recovered from reciprocating engine electrical generators powered by the non-condensable gases. Alternatively, tires may be prepared separately and then brought to the pyrolysis processing plant for decomposition. In this case, the tires may still be dried to remove any excess or residual moisture, or may be used directly.

Preferably, the tire shred 201c introduced to the pyrolysis processor is small in order to produce a better quality carbon and oil when used with embodiments as described herein, and to reduce the time required for pyrolysis to occur, thus increasing the capacity of the processor or reducing the required capital expenditure for the processor. The tire shreds may come from multiple sources. The pyrolysis facility may include an on-site location to process the tires before the pyrolysis is performed. The tires and/or tire shreds may be processed at the front end of the pyrolysis process with equipment to remove any steel and much of the reinforcing fiber from the tire shreds. The on-site equipment may be directly in-line with the pyrolysis equipment line, or may be adjacent to the pyrolysis equipment line. Alternatively, the tire shreds may be pre-processed off-site or obtained from an independent source.

In an exemplary embodiment, tires are cut to pieces less than 6 inches in length. Preferably, the tire shreds are cut to pieces less than about 2 inches in length. For example, an exemplary tire shred is approximately ¾ inches wide by ¾ inches long by ⅜ inches thick, or smaller. Although a larger shred size may be used, smaller shreds are preferable. Larger shred sizes, including 6 inches in length and 1.5 inches wide may not be as effectively conveyed through a continuous pyrolysis system. Further, shred sizes greater than ⅜ inches thick may not pyrolyze as quickly or as uniformly as shreds of smaller thickness due to the thermal properties of rubber, i.e., rubber is a very poor thermal conductor. Smaller shred sizes are also preferred to produce a more uniform quality carbon and oil when processed with a continuous-process as used with embodiments as described herein. Therefore, smaller shreds are preferred.

In one embodiment, the tire shreds are precisely sized so their dimensions do not vary by more than a fixed percent. In one embodiment, the tire shreds are of a bulk density that does not vary by more than 0 to 20% percent. Tire shreds of a uniform size and/or bulk density pyrolyze more uniformly as compared to tire shreds of a non-uniform size and/or density. Therefore, tire shreds of a uniform dimension and/or density are preferred to produce a more uniform quality carbon and oil and non-condensable gas when processed with a continuous-process as used with embodiments as described herein.

Dry shreds are also preferred as the dry shreds reduce the thermal heat load needed to bring the material to a temperature sufficient for pyrolysis. In addition, a dry feedstock allows the producer to control the amount of water vapor in the processor, thus controlling the side chain reaction of water with carbon to produce carbon monoxide and carbon dioxide, depending on operating temperatures. Also, excess water vapor can report with the oil products causing emulsions. Removing water from tire shreds is easier than removing water from emulsions after the pyrolysis process. Accordingly, even if the shreds are obtained from an off-site source, the shreds may still be pre-treated to remove excess water according to embodiments described herein.

In one embodiment, steel is removed from the tire shreds before the pyrolysis process. Many passenger and truck tires include steel-belts that are preferably removed when preparing the tires for the pyrolysis process. Steel remaining in the shred may not effectively transfer through the continuous pyrolysis process creating difficult material handling problems leading to plugging of the system. Further, the reinforcing steel strands in the tires tend to knit together once freed from the vulcanized rubber matrix, forming steel "hairballs" that further complicate material handling. Moreover, the presence of steel in shreds may damage or prematurely wear equipment, such as valves, piping, etc., due to its abrasive nature. Therefore, steel is preferably removed along with nearly all of the reinforcing fiber. Various steel and fiber removal processes during shredding may be used, such as those used to produce crumb rubber, arena rubber, and playground rubber. The removed steel may be separated and recycled separately from the remaining tire shreds.

Mechanical conveying systems 202 may be used to transfer raw materials 201a, 201b, 201c to the pyrolysis processor 210. Exemplary conveyor systems 202 that may be used to transport the raw materials may include, for example, bucket elevators or other mechanical means. In one embodiment, a positive pressure pneumatic conveying system is used to carry the tire-shreds to the top of the pyrolysis processor. For example, the pneumatic conveying system carries tire shreds approximately 50 feet vertically to the top of the pyrolysis processor 210. Pneumatic transportation reduces the total inventory of shreds, compared to a mechanical alternative such as a bucket elevator, minimizing the possibility of contamination and reducing the magnitude of fire hazard in the material handling equipment. Further, vertical processing of material maximizes the use of gravity to move tire shreds and minimizes the use of material handling equipment between unit operations. At the end of the positive pressure pneumatic transfer system, the air may be separated from the shreds via an air separator cyclone and then gravity dropped into a chute 212. The chute 212 may be generally cylindrical. The chute may also include a larger diameter section at the discharge compared to the inlet. This inverted conical shape reduces the possibility of chute plugging as rubber shreds have a high coefficient of friction and tend to easily plug a chute.

Figure 2B:
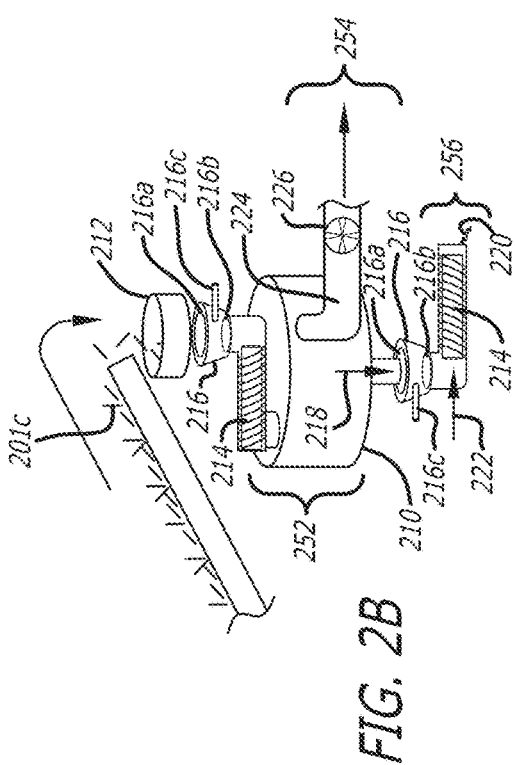

Referring to FIG. 2B, in the exemplary system, tire shreds 201c are pyrolyzed in a processor 210 at a temperature sufficient for pyrolysis. Processor 210 may be, for example, as described above with respect to FIG. 1. The incoming shreds 201c may be degassed before entering the processor 210. After being degassed, the shreds enter the top of the pyrolysis processor 210, which is heated by heating elements and gravity dropped onto a rotating product tray. The processor may heat the solids sufficient for pyrolysis, such as over 790° F. Preferably, the processor heats the material to between approximately 825° F. and 980° F. The solids are maintained at approximately +/−1° F. through radiative, convection, and conduction heating. In one embodiment, the pyrolysis processor additionally or alternatively continually removes oxygen from the system. Therefore, the pyrolysis processor 210 is constantly purged with nitrogen gas to maintain the oxygen level at or below 1%. In one embodiment, the pyrolysis processor 210 consists of a vertical rotating tray reactor. The solid materials travel down multiple revolving trays through the use of a stationary mechanical rake and stationary leveler arm system on each horizontal tray. The rake efficiently moves the shreds from tray to tray, while the leveling system may spread out the piles and thus ensure effective heat transfer and pyrolysis. Gas flow is maintained across the shreds in trays by a center turbo fan. This process continues until the pyrolysis reaction of initial material is complete. At this time, the TDCB reaches the product exit 218 and is removed from the pyrolysis processor 210.

The size of the thermal processing unit may depend on the design capacity of the specific installation. For example, 15 to 25 revolving trays, spaced 4 to 20 inches apart vertically, may be used with a thermal processing unit that is 10 to 20 feet in diameter and 15 to 40 feet tall. Batch processes may also be used for the pyrolysis, but may not be as efficient. Moreover, batch processes can operate under vacuum as the preferred method of evacuating the air contained in the void fraction volume between the tire chips. However, batch systems typically have no convenient or inexpensive way of gently circulating pyrolysis gases to improve heat transfer and reaction chemistry. Further, the batch vessel must be cooled to less than 400° F. after every batch to allow the TDCB to be removed from the vessel at a temperature beneath the auto-ignition temperature of TDCB, approximately 500° F. Such time consumption and loss of thermal heat render other processes inefficient.

In one embodiment, nitrogen purging is used to remove oxygen, which occupies the void fraction between tire shred pieces and is absorbed in the tire shreds before entering the processor. Nitrogen is purged for a given amount of time to remove any oxygen present in the shreds. For example, the tire shreds 201c fall from the chute 212 onto an upper valve 216a which opens to allow a measured amount of material to gravity drop into a chamber 216 on top of a lower valve 216b. The upper valve 216a then closes. Nitrogen 216c is introduced to the chamber between the closed valves 216a and 216b to remove the oxygen entrained in the material flow. Oxygen is preferably limited in the thermal processor and immediately after the pyrolysis process to reduce the possibility of burning or explosions. After a given amount of time, the lower valve 216b is opened, and drops the shreds onto the next transfer system, before closing again for another controlled addition of shreds. After the lower valve 216b closes, the upper valve 216a opens to repeat the cycle. In one embodiment, the lower valve 12b is 12 inches in diameter, while the upper valve 12a is 8 inches in diameter, and the measured amount of material is about 1 cubic foot, and the given amount of time for nitrogen purging is approximately 0.3 minutes. Airlocks 216 before and after the processor 210 may operate in a similar manner. In one embodiment, the air lock 216 at the processor exit 218 employs nitrogen to purge furnace gases from the exiting char. The air lock chamber is fitted with a vacuum pump, which maintains a slight suction to exhaust the purge nitrogen and any furnace gases. The vacuum pump also pulls purge nitrogen from the cooling screw 214.

Cooling screws 214 may be used just before and/or just after the pyrolysis process to keep the transported material from becoming sticky or burning, respectively. These cooling screws may include hollow shaft and flights as well as an external cooling jacket to evenly cool the transported material. For example, the screw shaft and the flights are hollow, through which cool water from a cooling tower may flow. Further, the housing of the feed screw may be jacketed, where a contact flow of cooling tower water may also be circulated. In one embodiment, a feed screw 214 is used to transport the shreds 201c into the pyrolysis processor 210. In an exemplary embodiment, after removing the oxygen from the tire-shreds, the shreds are dropped into the feed screw. The feed screw may be purged with nitrogen as well to prevent pyrolysis gases from escaping the processor. The feed screw may also be cooled so that the thermal processing does not begin before the shreds enter the thermal processor. Use of a feed screw evens out the flow of shreds to the processor, avoiding excessive piling on the trays.

Solid materials 220 after pyrolysis may exit the bottom of the pyrolysis processor through an air lock 216. The solid materials 220 exiting from the air lock valve consist of TDCB and other compounds, collectively referred to as ash. The solid material may be removed from the pyrolysis processor 210 and cooled. The TDCB may be cooled below its auto-ignition temperature, approximately 500° F., to prevent it from burning after it is removed from the processor. For example, the material is discharged from the thermal processing unit via 1 cubic foot semi-continuous volumes through the airlock 216. The cooling system may include a cooling screw 214 as designed above to permit cool water from a cooling tower to flow through a hollow screw shaft and flights. The cooling screw may also be jacketed to permit additional cooling water to circulate. In one embodiment, the cooling screw cools the char from the pyrolysis temperature of approximately 980° F., to approximately 100° F., or below, before exiting the cooling screw. The cooling screw may of sufficient length to provide the appropriate cooling time for the char, such as for example approximately 20 feet long. In one embodiment, the cooling screw is also purged 222 with nitrogen to sweep furnace gases from the TDCB and to avoid the presence of oxygen while the TDCB cools, thus preventing the TDCB from igniting as it leaves the pyrolysis processor above its auto-ignition temperature. In addition, the nitrogen purge gas prevents processor gases from accompanying the TDCB through the cooling screw. Therefore, when the airlock 216 is opened to drop the solid material 220 into the cooling screw 214, purge gas 222 enters the airlock 216 and prevents the escape of pyrolysis gases. When the airlock 216 is closed, purge gas 222 is directed along the cooling screw 214 with the solid material 220 to prevent oxygen from entering the screw exit.

Figure 3:
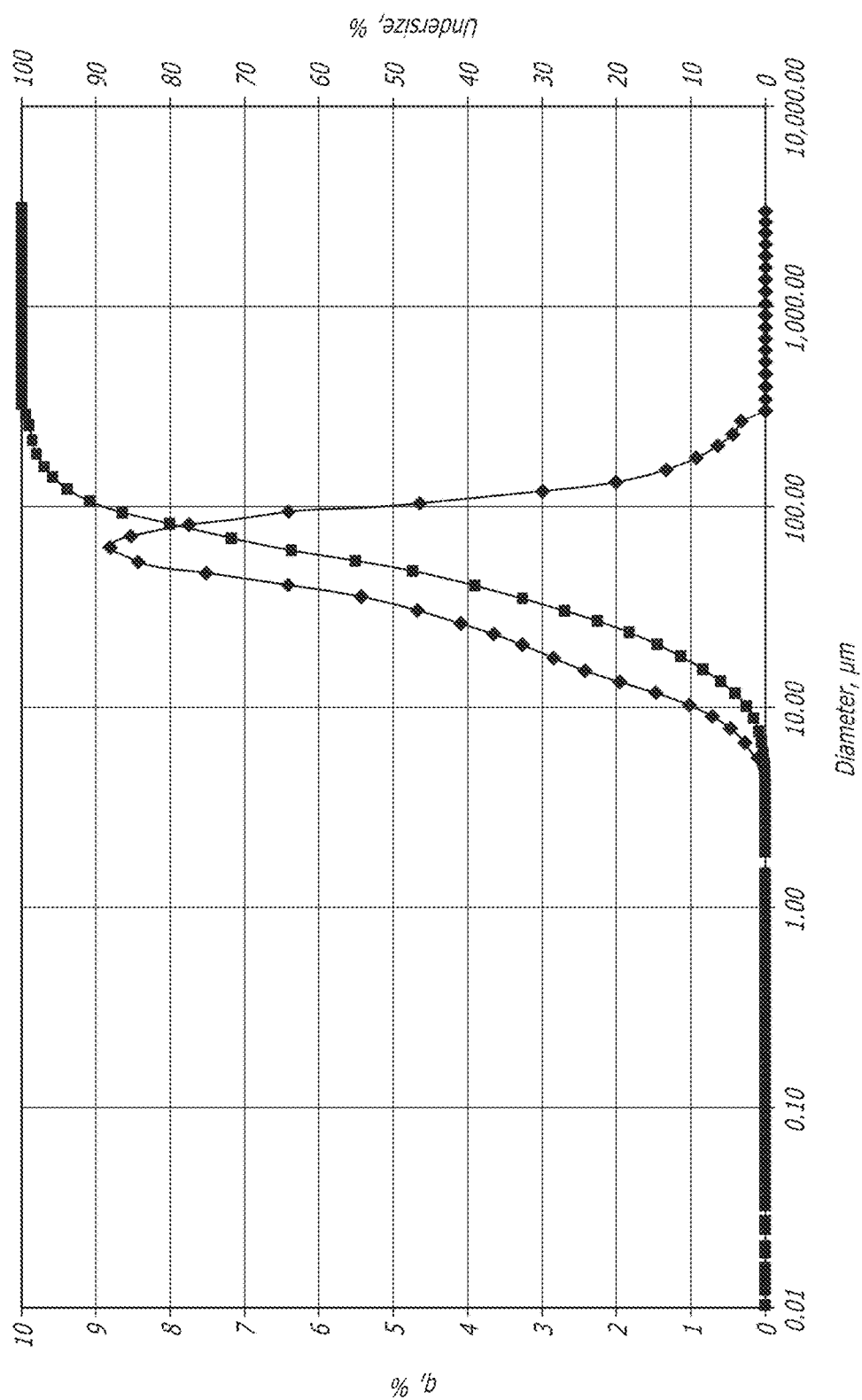
FIG. 3 illustrates an exemplary size distribution graph of the resulting solid material from the pyrolysis process of FIG. 2.

TDCB from the pyrolysis process described herein includes approximately 80-99% carbon containing up to 4% surface bound pyrolysis oil intermixed with 1-19% inorganic ash that contains up to 4% surface bound pyrolysis oil, and can include polar organic compounds intermixed with up to 2% ZnS particles. This material forms solid agglomerates that range in diameter from 0.040 μm to 10000 μm. FIG. 3 illustrates a size distribution of the resulting solid material. The TDCB exits the bottom of the processor and is collected. The TDCB may be used as an adsorbent having the characteristics as mentioned above and is applicable to various purposes, such as water purification, gas purification, air purification, solvent purification, hydrocarbon purification, vapor recovery, decolorization and deodorization. The TDCB can also be used as a colorant, useful for adding dark tones and grey tones to inks, plastics, polymers, paints, rubber materials, and inorganic materials such as cement, concrete, and plaster. The TDCB can also be used as a reinforcing agent in plastics, paints, rubber materials, and inorganic materials such as cement, concrete, and plaster.

In one embodiment of the process, TDCB aggregates are formed by blending carbon, inorganic metal oxides, including silicon oxides, zinc oxides, aluminum oxides together with a binder material such as a pyrolysis oil derived from rubber. The mixture is heated causing the binder material to flow in between the TDCB aggregates and the metal oxide aggregates. Further heating of the aggregates, in an inert gaseous atmosphere, i.e. a pyrolysis process, causes the binder material to break down, leaving a coating of a hydrocarbon liquid on the carbon and metal oxide particles.

In one embodiment, the TDCB, metal oxide aggregates mixed with the binder is used as the feedstock to the above described pyrolysis process. This material exits the bottom of the processor and is collected. The resulting TDCB aggregates can be used as a reinforcing agent in plastics, polymers, paints, rubber materials, and inorganic materials such as cement, concrete, and plaster. The TDCB aggregate can also be used to purify solvents, processing aids, and pigments from liquid based materials.

Referring back to FIG. 2A, the pyrolysis process may also remove and further process the pyrolysis gases 254. In one embodiment, the pyrolysis system 210 may further include an exhaust system 224 including an exhaust fan 226 to continuously remove the gaseous products of pyrolysis from the processor 210, including condensable and non-condensable gases. The pyrolysis gases may also be further treated to produce the desired products 254. For example, the system may also include various processes to condense out and separate pyrolysis oils from the non-condensable gases. The non-condensable gases represent a fuel gas, which may then be burned or used as fuel in generators to produce electricity.

In one embodiment, the pyrolysis process 200 may be fully automated. For example, an automated distributive control system is used, coupled with a human machine interface (HMI) system. The distributive control system is designed to include ladder logic and screen graphics. The automated system with the graphic interface permits the processing plant to be operated on a continuous basis (24/7) with minimal staffing. The system may also include additional built-in safety interlocks. Further, the system may include start-up and shut-down sequences that may automatically run once initiated by a technician.

FIG. 4 illustrates an exemplary system 400 for processing 254 the TDCB from the pyrolysis process of FIG. 2. In one embodiment, the solid material 220 of FIG. 2 undergoes further processing to produce a pelletized TDCB product. Pelletized TDCB is more stable and more easily handled than powdered TDCB, improving ease of handling, bagging, and shipping. Pelletized TDCB product also reduces airborne particulates, improves uniform dispersion in blending with rubber, plastics, liquids, and solids, and is specified by distributors and customers in commercial markets. With such markets, pelletized TDCB must meet additional specifications, such as size, crush strength, pour density, fines content, and binder type. Other known pyrolysis methods and formulations used to produce pelletized TDCB fail to meet one or more of these specifications, perhaps due to the size, structure, or composition of the TDCB. This embodiment produces a pelletized TDCB product meeting the specifications of these commercial markets, and consists of the following stages as shown in FIG. 4: size reduction 402, classification 404, pellet formation 406, pellet drying 408, screening 410, and bagging 412. The method of transfer 414 between any of the above stages may be pneumatic, screw auger, conveyer, or by way of containers such as bins or bags.

In the size reduction stage 402, the TDCB is transferred into a size reducer to reduce the average agglomerate size of the pyrolysis-derived TDCB to a desired size range. For example, and depending on distributor or customer specifications, the size reduction stage can take the TDCB from an average agglomerate size of approximately 500 microns to an average size of between approximately 50-20 microns, or between approximately 20-10 microns, or less than approximately 5 microns, or even down into the submicron range. In addition, the size reduction stage 402 can be used to break down residual fiber or mineral content contained in the TDCB. The size reduction stage 402 produces a TDCB that has a specific size distribution range. Size reduction is accomplished using any of the following size reduction mills, including but not limited to a jet mill, an air classifier mill, a hammer mill, a roller mill, a ball mill or a vibratory mill (using ceramic or steel cylinders) to break down the TDCB agglomerates. The method of transfer 414 between the pyrolysis process into the size reduction stage 402 may be pneumatic, screw auger, conveyer, or by way of containers such as bins or bags. The result of this processing stage is a size-reduced TDCB.

After the size reduction stage 402, size-reduced TDCB is optionally transferred to a classification stage 404 for removal of any residual fiber and any oversized or undersized agglomerates of TDCB and minerals. The method of transfer 414 between the size reduction stage 402 and the classification stage 404 may be pneumatic, screw auger, conveyer, or by way of containers such as bins or bags. The classification stage 404 can consist of a set of screens with defined mesh sizes, in which size-reduced TDCB selectively passes through affording the removal of oversized material. Alternatively, size-reduced TDCB can be translated into an air classifier system configured to remove any residual fiber or oversized and undersized agglomerates of TDCB and minerals, affording the desired size-reduced classified TDCB product.

Following the size reduction stage 402 and/or classification stage 404, the pyrolysis-derived, size-reduced and/or classified TDCB, hereinafter referred to as the "TDCB product" is transferred to a pelletizing stage 406, where it is mixed with a binder to form pellets. The method of transfer 414 to the pelletizing stage 406 may be pneumatic, screw auger, conveyer, or by way of containers such as bins or bags. Once transferred to the pelletizing stage 406, the TDCB product is mixed with a binder, via a binder delivery system in suitable proportions to initiate and propagate pelletization. The binder may be liquid, including water, or an aqueous mixture containing binder materials such as Lignin, Calcium Ligninsulfonate, Molasses, starch, sugar, salts, water soluble polymers such as polyvinyl alcohol, polycarboxylic acid, cellulosics, or mixtures thereof. Alternatively, the binder may be a hydrocarbon oil, wax, asphaltene or tar. The binder may also include a pyrolysis-derived oil product, either added or bound in the TDCB product as a result of the pyrolysis and post-processing conditions. The concentration of the binder relative to the TDCB product may vary from approximately 0.1 weight percent to 90 weight percent. The binder may be continuously mixed with the TDCB product via a metering system, such as a spray, or as a liquid stream. The preferred method of pelletization includes but is not limited to a pin mill pelletizer equipped with either cylindrical rods, or blades oriented in a specific configuration. The properties of the TDCB product are dependent on the binder type, binder concentration, temperature, rotation speed of the mill, TDCB properties, and residence time in the pelletizer. The size of the TDCB product may fall in the range from approximately 0.01 microns to 6000 microns.

After the pelletized TDCB product is formed, it exits the pelletizing stage 406 and is transferred optionally to a drying stage 408. The method of transfer 414 between the pelletizing stage 406 and the drying stage 408 may be pneumatic, screw auger, conveyer, or by way of containers such as bins or bags. The drying stage 408 is used to fix the binder concentration at a desired level or range and is typically from approximately 0.01 weight percent to 90 weight percent relative to the pelletized TDCB product. The pellets may also be dried to further impart specific properties to the pellet such as pellet size range, pellet hardness, pour density, flowability, and fines content. The final properties of the pellets are dependent on the final binder/pelletized TDCB product concentration, heating temperature, drying time, and heating profile. Examples of drying systems include, but are not limited to, a vibratory bed with forced gas, e.g. air, that is optionally heated, an internally or externally heated rotary kiln with or without forced gas, a forced gas and or/heated conveyance oven, or a convection oven.

After desired drying, the pelletized TDCB product may be transferred to a screening stage 410 to yield pellets within a specified size range. The method of transfer 414 between the drying stage 408 and the screening stage 410 may be pneumatic, screw auger, conveyer, or by way of containers such as bins or bags. In one embodiment the screening stage 410 consists of a series of screens with specific mesh sizes. As pelletized TDCB product is transferred onto the screens, oversized pellets and undersized pellets are removed according to size. For example, pellets used in rubber processing may be required to have a size of minus 14 mesh to plus 35 mesh. This indicates that pellets fit through a 14 mesh screen and are retained on a 35 mesh screen. Pellets outside this range can be transferred back to the size reduction stage 402 for reprocessing, alternatively used for another product, or not used.

After the screening stage 410, the specified pelletized TDCB product is transferred to a bagging stage 412 where it is loaded into bags or other containers for shipping, storage, or subsequent use. The method of transfer 414 between the screening stage 410 and the bagging stage 412 process may be by pneumatic, screw auger, conveyer, or by way of containers such as bins or bags.

The solid refining processes 400 as described herein may be implemented independently, re-sequenced, or used in various combinations and sub-combinations as would be understood by a person of skill in the art. After any of the above stages, product may be transferred into bags or other containers for shipping, storage, or subsequent use. Select processes may also be implemented while others are not. For example, the solid material 220 may be separated and classified as in step 404 described above, and then directly bagged, as in step 412, without the intervening steps of pelletization. Other combinations and sub-combinations of the described processes are also within the scope of the present disclosure. In one embodiment, the solid material 220 is transferred from the cooling screw 214 of FIG. 2 through a gravity-drop chute to a screener for size separation. The desired TDCB is then dropped to a pneumatic transfer system that carries it to an air classifier. The separated TDCB may then be further classified by weight and particle size. Preferably, the end product is a fine powdery material.

The product stream, consisting of very fine material, may also have a small amount of heavier and larger particle size material, including fiber, which may not have effectively pyrolyzed. The classifier may effectively separate the material by weight and/or size of particles as the product continuously flows through the system. For example, the classifier system removes material sized between 0.1 microns and 10 microns from the product stream. Such material contains minerals of zinc oxide and silicon dioxide and aluminum oxide, which represent additives to the original formulation of the tires. Removal of the minerals effectively improves the purity of the TDCB product, reducing its ash content. Further, the air classifier may remove oversized material greater than 200 microns in size including fibers that remain unpyrolyzed, thus ensuring product purity. An exemplary particle size distribution of TDCB product exiting the air classifier is shown in FIG. 3. The target TDCB, selected by particle size and weight, may then drop out to a final system for bagging 412. For example, the target TDCB particles are dropped out to a final pneumatic system that transfers the particles for bagging.

Figure 5B:
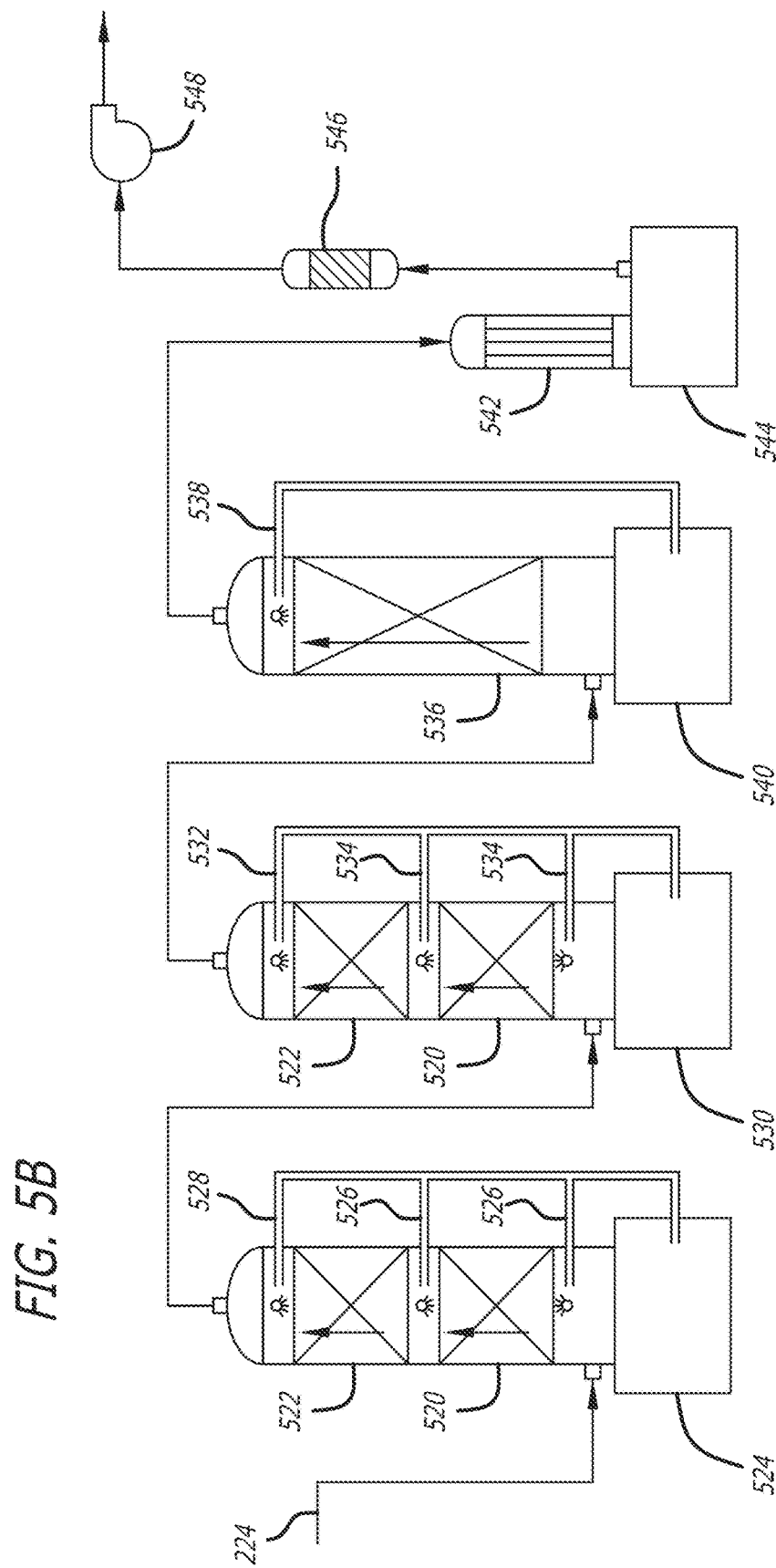

FIGS. 5A and 5B illustrate exemplary systems for processing 254 the gases from the pyrolysis process of FIG. 2. In one embodiment, FIG. 5A, the system includes a water-cooled condenser to separate the condensable and non-condensable gases after the pyrolysis process. This produces a "flash" cooling of the sublimed oils from approximately 600° F. to 85° F. Alternatively, FIG. 5B, the pyrolysis gases can be processed through multiple condensing towers operating at different temperatures so that the oils can be condensed by slowly lowering the temperature. In this manner, higher molecular weight compounds are formed and the condensed liquids can be separated by their boiling points into higher value compounds. Condensed oils may further be treated to remove carbon dust, inorganic ash, low boiling hydrocarbons and condensed water, if any.

FIG. 5A illustrates an exemplary system for processing the gases 501a from the pyrolysis process 224 including flash cooling of the sublimed oils to separate the oils 501b from the non-condensable gases 501c. When a water-cooled condenser is employed to condense the pyrol oils, the condensed oils 501b can be used to scrub the processor gases to remove entrained TDCB dust from the non-condensable gases, thus avoiding carbon dust buildup in downstream processes. For example, a vertical condenser 502 consisting of a shell and tube heat exchanger may be used to cool the condensable gas with either cooling water or chilled water. The incoming gases may be cooled to a temperature between 150° F. to 200° F. or below to separate the pyrol oils. The oils collect at the bottom of the condenser and are then filtered 504a to remove the dust from the product oils. A portion of the condensed oils 501b may be re-circulated back to the front of the condenser to improve the liquid velocity on the heat exchanger surface and to scrub TDCB from the surfaces of the exchanger. Use of a vertical condenser aids in keeping the entire circumference of the tubes clean of carbon dust buildup. One or more vertical condensers 502 may be used to condense the pyrol oils. One or more sprayers 504 may be used to distribute the re-circulated oils 501b to the gas stream. The sprayers introduce the oils 501b to the interior of the condenser to contact the gas stream. The re-circulated oils capture particulate matter from the gas stream, cool the incoming gas stream, and scrub the interior surface of the condenser to maintain the heat exchange efficiency of the condenser. The uncondensed gases 501d may then further be processed, as described below. In the exemplary embodiment of FIG. 5A, the uncondensed gases are filtered through mist eliminators 506 and then transported to a combustion unit. A vapor exhaust fan 508, as described with respect to FIG. 2 may be used to move the exhaust gases through the system.

FIG. 5B illustrates an exemplary system for processing the gases from the pyrolysis process including multiple condensing towers operating at different temperatures to slowly condense the sublimed oils and separate the oils by molecular weights. In one embodiment, the oils can be condensed in multiple packed towers operating at gradually reduced temperatures. Condensation under a gentle temperature gradient, wherein the gases are cooled from approximately 600° F. to 250° F. over approximately a 5 to 12 second period, encourages the formation of larger organic compounds, C8 to C20 and above, and a corresponding reduction in the formation of smaller C4 to C7 organic compounds. In this manner, the condensed oil molecular weight and physical properties of the product oil can be controlled, whereas a quicker, or "flash," condensation of the oils produces a product oil with a greater proportion of lower molecular weight compounds and greater volatility.

Referring to FIG. 5B, pyrolysis gases enter Column 1 from the exhaust system 224 at a temperature of approximately 600° F. to 800° F. The gases proceed through a structured packing material 520 designed to capture small amounts of entrained TDCB dust. The gases continue through the next section 522 of Column 1, containing sheet packing or loose packing to provide a condensation surface, where higher molecular weight oils are condensed. Condensed oils fall by gravity into a capture tank 524 where they are heated to approximately 500° F. to 550° F. and pumped through sprayers 526 to remove any buildup of carbon dust. Condensed oils are also pumped to the top of Column 1 through a spray nozzle 528. Oil re-circulated to the top of the column is used as a heating media to maintain the column at the desired condensing temperature. Column 1 operates at a nominal temperature of approximately 325° F. to 420° F.

Uncondensed vapors continue to Column 2, which operates similarly to Column 1 but at an operating temperature of approximately 275° F. to 375° F. Condensed oils are captured in a retention tank 530, which serves as a reservoir for pumping condensed oils through a spray nozzle 532 at the top of the column. Sprayers 534 circulate the condensed oils to remove any buildup of carbon dust within the structured packing material 520, as described above. In one embodiment the condensation towers consist of unjacketed pipe sections fitted with packing materials to provide either the filter or condensing surfaces. The packing materials may be either sheet packing or loose packing.

Pyrolysis gases with boiling points lower than approximately 300° F. to 350° F. continue to the bottom of Column 3. This column, operating at approximately 175° F. to 325° F., is filled with either sheet packing or loose packing 536 to promote condensation. Column 3 is also fitted with a spray nozzle 538 at the top of the column. Circulating oil serves to maintain the column operating temperature. Condensed oils are captured in a reservoir 540. Gases exiting Column 3 are processed through a water-cooled heat exchanger 542 where the vapors are cooled to approximately 60° F. to 85° F. to condense any remaining light hydrocarbons and water. The condensate is collected in reservoir 544. The remaining gas stream, consisting of minute entrained oil droplets plus non-condensable gases such as methane, hydrogen, carbon dioxide, carbon monoxide and water vapor, is processed through a coalescing filter 546 to remove the oil droplets before entering an exhaust blower 548. The non-condensable gases represent a fuel gas for use in an engine generator for production of electrical power and exit the system at approximately 60° F. to 85° F.

One embodiment uses a ceramic filter to remove the fine TDCB from the pyrolysis gases before the gases are processed. The filter surfaces are kept at the same or higher temperature as the operating temperature of the pyrolysis processor to avoid condensation of the pyrol oils on the filter surfaces.

The gases remaining downstream of the condenser, collectively referred to as non-condensable gases, may consist primarily of hydrogen, methane, ethane, carbon dioxide, and carbon monoxide. In the exemplary embodiment, the non-condensable gases are removed continuously from the thermal processing unit along with the condensable gas. The non-condensable gas is separated from the condensable oils as described above. The non-condensable gases, constituting 8 to 30% of the weight of the incoming tire feedstock, may then be transported by the exhaust fan to a combustion unit, or utilized as a synthetic fuel gas in gas-fired generators to produce electricity. For example, the non-condensable gases may constitute a fuel gas, which may be combusted in a reciprocating engine generator to create electricity. In either case, there are minimal adverse effects on the environment.

It is important to note that the described Pyrolysis System and Methods embodies numerous novel features that, individually and in combination, distinguish it from prior art of tire pyrolysis and pyrolysis material post processing. As such, it may be characterized in a number of ways using one or more of such features. Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. Accordingly, the description is not intended to limit the application of the embodiments as described to the construction and arrangement of the components as set forth in the detailed description and illustrated drawings. Also, it is to be understood that the terminology employed herein are for purpose of description and should not be regarded as limiting.

While examples are provided herein with respect to steel-free tire shred pyrolysis systems and processes, the principles of the invention described herein may be applicable for use with other types of carbonaceous feedstocks, such as plastics and wood. Furthermore, although embodiments of the invention may be described and illustrated herein in specific embodiments or provided in combination, it should be understood that the embodiments are not so limited. Various features of the invention, which are, for brevity, described in the context of a single embodiment, may also be provided separately or in any suitable sub-combination. Further, features as described in the context of separate embodiments may be recombined into any suitable sub-combination.

What is claimed is:

1. A method of pyrolysis to recover the carbon black in steel-free tire shreds, comprising:
   introducing a carbonaceous feedstock consisting of steel-free tire shreds into a top portion of a vertical tray pyrolysis processor comprising a plurality of trays and a heating element, the introducing comprising deoxygenating the carbonaceous feedstock by utilizing a nitrogen purge system;
   heating the tire shreds to a temperature above about 790° F. to pyrolyze the tire shreds and form a plurality of solids and pyrolysis gasses;
   circulating the pyrolysis gasses in the pyrolysis processor;
   moving the solids from trays positioned higher in the pyrolysis processor to trays positioned lower in the pyrolysis processor, the solids contacting the pyrolysis gasses during the moving;
   removing carbon black from a bottom portion of the pyrolysis processor; and
   removing pyrolysis gasses from a top portion of the pyrolysis processor.

2. The method according to claim 1, wherein the plurality of trays are aligned with and supported by a rotating drive shaft.

3. The method according to claim 2, further comprising rotating the plurality of trays around the drive shaft.

4. The method according to claim 1, wherein the circulating pyrolysis gasses provide convective heat transfer to the solids to contribute to the maintenance in the solids of a generally uniform temperature.

5. The method according to claim 1, wherein the heating element provides radiative heat.

6. The method according to claim 1, wherein the pyrolysis gasses formed at trays positioned lower in the pyrolysis processor circulate upward to trays positioned higher in the pyrolysis processor.

7. The method according to claim 1, wherein the moving step includes using a leveling arm to level the solids in the trays, and using a rake for dropping the solids through slots in the trays.

8. The method according to claim 1, wherein the introducing step comprises introducing steel-free tire shreds having a size of approximately 3/4×3/4×3/8 inch.

9. The method according to claim 1, further comprising degassing the feedstock before introducing the feedstock into the pyrolysis processor and degassing the carbon material from the pyrolysis processor, wherein the degassed feedstock is transported to the pyrolysis processor and the degassed carbon material is transported from the pyrolysis processor through a cooling screw including a cooling material through a shaft, flight, and jacket of the cooling screw.

10. The method according to claim 1, wherein the step of removing carbon black comprises removing carbon black comprising approximately 80-99% carbon containing up to 4% surface bound pyrolysis oil intermixed with 1-19% inorganic ash, with organic compounds intermixed with up to 2% ZnS particles.

11. The method according to claim 1, further comprising processing the carbon black removed from the bottom portion of the pyrolysis processor, the processing comprising:
   size reducing the carbon black to create a reduced carbon black product generally under 20 micrometers;
   classifying the reduced carbon black product by size to remove particles over an undesirable size to provide a generally uniform carbon black product;
   pelletizing the generally uniform carbon black product by mixing the generally uniform carbon black product with a binder, forming pellets, and drying the pellets; and
   screening the pellets for a desired size distribution.

12. The method according to claim 11, wherein size reducing the carbon black is performed by a size reduction mill, the classifying is performed with a series of screens of desired mesh size, the pelletizing comprises pelletizing with a binder of a pyrolysis-derived oil product, and the screening produces a desired size distribution of between minus 14 mesh and positive 35 mesh.

13. The method according to claim 1, further comprising maintaining a temperature gradient throughout the pyrolysis processor between 1° F. and 40° F.

14. The method according to claim 1, wherein the nitrogen purge system comprises a holding chamber, wherein the deoxygenating comprises isolating amounts of the carbonaceous feedstock in the holding chamber and removing air from the carbonaceous feedstock using nitrogen.

15. The method according to claim 1, wherein the pyrolysis processor includes a first airlock positioned at the top portion, and a second airlock positioned at the bottom portion and wherein the nitrogen purge system includes a first nitrogen purge system and a second nitrogen purge system, the method further comprising deoxygenating materials passing through the first and second airlocks by using the first and second nitrogen purge systems.

16. The method according to claim 15, wherein the first and second nitrogen purge systems comprise respective first and second holding chambers, wherein the deoxygenating comprises isolating amounts of the materials in the holding chambers and removing air therefrom using nitrogen.

17. The method according to claim 1, wherein the introducing comprises maintaining a neutral pressure in the pyrolysis processor at +/−3 inches WC.

18. A method of pyrolysis to recover the carbon black in steel-free tire shreds, comprising:
   introducing a carbonaceous feedstock consisting of steel-free tire shreds into a top portion of a vertical tray pyrolysis processor comprising a plurality of trays and a heating element, wherein the plurality of trays are aligned with and supported by a rotating drive shaft;
   heating the tire shreds to a temperature above about 790° F. to pyrolyze the tire shreds and form a plurality of solids and pyrolysis gasses;
   circulating the pyrolysis gasses in the pyrolysis processor;
   moving the solids from trays positioned higher in the pyrolysis processor to trays positioned lower in the pyrolysis processor, the solids contacting the pyrolysis gasses during the moving;
   removing carbon black from a bottom portion of the pyrolysis processor; and
   removing pyrolysis gasses from a top portion of the pyrolysis processor.

19. The method according to claim 18, further comprising rotating the plurality of trays around the drive shaft.

20. The method according to claim 18, wherein the introducing comprises maintaining a neutral pressure in the pyrolysis processor at +/−3 inches WC.

21. A method of pyrolysis to recover the carbon black in steel-free tire shreds, comprising:
   introducing a carbonaceous feedstock consisting of steel-free tire shreds into a top portion of a vertical tray pyrolysis processor comprising a plurality of trays and a heating element;
   heating the tire shreds to a temperature above about 790° F. to pyrolyze the tire shreds and form a plurality of solids and pyrolysis gasses;
   circulating the pyrolysis gasses in the pyrolysis processor;
   moving the solids from trays positioned higher in the pyrolysis processor to trays positioned lower in the pyrolysis processor, the solids contacting the pyrolysis gasses during the moving;
   removing carbon black from a bottom portion of the pyrolysis processor, the carbon black comprising approximately 80-99% carbon containing up to 4% surface bound pyrolysis oil intermixed with 1-19% inorganic ash, with organic compounds intermixed with up to 2% ZnS particles; and
   removing pyrolysis gasses from a top portion of the pyrolysis processor.

22. The method according to claim 21, wherein the introducing comprises maintaining a neutral pressure in the pyrolysis processor at +/−3 inches WC.

23. A method of pyrolysis to recover the carbon black in steel-free tire shreds, comprising:
   introducing a carbonaceous feedstock consisting of steel-free tire shreds into a top portion of a vertical tray pyrolysis processor comprising a plurality of trays and a heating element;
   heating the tire shreds to a temperature above about 790° F. to pyrolyze the tire shreds and form a plurality of solids and pyrolysis gasses;
   circulating the pyrolysis gasses in the pyrolysis processor;
   moving the solids from trays positioned higher in the pyrolysis processor to trays positioned lower in the pyrolysis processor, the solids contacting the pyrolysis gasses during the moving;
   removing carbon black from a bottom portion of the pyrolysis processor;
   removing pyrolysis gasses from a top portion of the pyrolysis processor; and
   processing the carbon black removed from the bottom portion of the pyrolysis processor, the processing comprising:
      size reducing the carbon black to create a reduced carbon black product generally under 20 micrometers;
      classifying the reduced carbon black product by size to remove particles over an undesirable size to provide a generally uniform carbon black product;
      pelletizing the generally uniform carbon black product by mixing the generally uniform carbon black product with a binder, forming pellets, and drying the pellets; and
      screening the pellets for a desired size distribution.

24. The method according to claim 23, wherein the introducing comprises maintaining a neutral pressure in the pyrolysis processor at +/−3 inches WC.

25. The method according to claim 23, wherein size reducing the carbon black is performed by a size reduction mill, the classifying is performed with a series of screens of desired mesh size, the pelletizing comprises pelletizing with a binder of a pyrolysis-derived oil product, and the screening produces a desired size distribution of between minus 14 mesh and positive 35 mesh.

26. A method of pyrolysis to recover the carbon black in steel-free tire shreds, comprising:
   introducing a carbonaceous feedstock consisting of steel-free tire shreds into a top portion of a vertical tray pyrolysis processor comprising a plurality of trays and a heating element;
   heating the tire shreds to a temperature above about 790° F. to pyrolyze the tire shreds and form a plurality of solids and pyrolysis gasses;
   circulating the pyrolysis gasses in the pyrolysis processor;
   moving the solids from trays positioned higher in the pyrolysis processor to trays positioned lower in the pyrolysis processor, the solids contacting the pyrolysis gasses during the moving;
   maintaining a temperature gradient throughout the pyrolysis processor between 1° F. and 40° F.;
   removing carbon black from a bottom portion of the pyrolysis processor; and
   removing pyrolysis gasses from a top portion of the pyrolysis processor.

27. The method according to claim 26, wherein the introducing comprises maintaining a neutral pressure in the pyrolysis processor at +/−3 inches WC.

28. A method of pyrolysis to recover the carbon black in steel-free tire shreds, comprising:
   introducing a carbonaceous feedstock consisting of steel-free tire shreds into a top portion of a vertical tray pyrolysis processor comprising:
      a plurality of trays;
      a heating element;
      a first airlock positioned at the top portion; and a second airlock positioned at a bottom portion;
heating the tire shreds to a temperature above about 790° F. to pyrolyze the tire shreds and form a plurality of solids and pyrolysis gasses;
circulating the pyrolysis gasses in the pyrolysis processor;
moving the solids from trays positioned higher in the pyrolysis processor to trays positioned lower in the pyrolysis processor, the solids contacting the pyrolysis gasses during the moving;
removing carbon black from a bottom portion of the pyrolysis processor;
removing pyrolysis gasses from a top portion of the pyrolysis processor; and
deoxygenating materials passing through the first and second airlocks by using a first and second nitrogen purge system.

29. The method according to claim 28, wherein the introducing comprises maintaining a neutral pressure in the pyrolysis processor at +/−3 inches WC.

30. The method according to claim 28, wherein the first and second nitrogen purge systems comprise respective first and second holding chambers, wherein the deoxygenating comprises isolating amounts of the materials in the holding chambers and removing air therefrom using nitrogen.

31. A method of pyrolysis to recover the carbon black in steel-free tire shreds, comprising:
introducing a carbonaceous feedstock consisting of steel-free tire shreds into a top portion of a vertical tray pyrolysis processor maintained at a generally neutral pressure of +/−3 inches WC, the processor comprising a plurality of trays and a heating element;
heating the tire shreds to a temperature above about 790° F. to pyrolyze the tire shreds and form a plurality of solids and pyrolysis gasses;
circulating the pyrolysis gasses in the pyrolysis processor;
moving the solids from trays positioned higher in the pyrolysis processor to trays positioned lower in the pyrolysis processor, the solids contacting the pyrolysis gasses during the moving;
removing carbon black from a bottom portion of the pyrolysis processor; and
removing pyrolysis gasses from a top portion of the pyrolysis processor.

* * * * *